United States Patent [19]

Reiger

[11] Patent Number: 4,888,914

[45] Date of Patent: Dec. 26, 1989

[54] METHOD AND FABRIC CONTAINER FOR CONTROLLING ROOT GROWTH

[76] Inventor: Ralph E. Reiger, 4131 N. Portland, Oklahoma City, Okla. 73112

[21] Appl. No.: 197,572

[22] Filed: May 23, 1988

[51] Int. Cl.[4] .......................... A01G 23/04; A01G 9/02
[52] U.S. Cl. ........................................... 47/78; 47/73
[58] Field of Search ...................... 47/9, 73, 74, 76, 77, 47/78, 56, 66

[56] References Cited

U.S. PATENT DOCUMENTS

| | | | |
|---|---|---|---|
| 2,252,073 | 8/1941 | Gray | 47/78 |
| 2,902,795 | 9/1959 | Heigh et al. | 47/78 X |
| 3,415,012 | 12/1968 | Stubbmann | 47/78 |
| 3,988,519 | 10/1976 | Stoller | 428/401 |
| 4,574,522 | 3/1986 | Reiger et al. | 47/78 |
| 4,613,529 | 9/1986 | Yamashita et al. | 428/15 |
| 4,697,382 | 10/1987 | Koeniger | 47/73 X |
| 4,729,913 | 3/1988 | Matsui | 428/15 |

FOREIGN PATENT DOCUMENTS

| | | | |
|---|---|---|---|
| 172060 | 2/1986 | European Pat. Off. | 47/73 |
| 2161297 | 6/1973 | Fed. Rep. of Germany | 47/78 |
| 3304352 | 11/1983 | Fed. Rep. of Germany | 47/73 |
| 2280314 | 2/1976 | France | 47/9 |
| 8404227 | 11/1984 | World Int. Prop. O. | 47/76 |

Primary Examiner—Danton D. DeMille
Attorney, Agent, or Firm—Laney, Dougherty, Hessin & Beavers

[57] ABSTRACT

An improved method and fabric container for controlling the root growth of nursery stock planted in the ground prior to transplanting are provided. In accordance with the method, the root growth is confined in the ground within a porous fabric container formed of needle punched continuous fibers whereby the roots are readily caught and caused to initially penetrate the container, but the fabric constricts the roots sufficiently to produce nodule formation and root branching within the container.

7 Claims, 2 Drawing Sheets

METHOD AND FABRIC CONTAINER FOR CONTROLLING ROOT GROWTH

BACKGROUND OF THE INVENTION

1. Field of the Invention

The present invention relates to an improved method and fabric container for controlling root growth, and more particularly, to an improved method and fabric container for controlling root growth of nursery stock planted in the ground prior to transplanting such nursery stock.

2. Description of the Prior Art

The growing of nursery stock, such as trees and the like, in above-ground containers has been a commercial practice for many years. However, the practice of growing trees in such containers is efficient and economical only during the early period of development of the tree. The continued growth of trees in such containers involves a number of problems, e.g., high summer temperatures reduce the plant and root growth because the soil in the container reaches abnormally high temperatures. Low winter temperatures often damage or kill the roots of trees in containers, and the trees and containers are readily blown over. In contrast, when nursery stock such as trees are grown in the ground, the surrounding soil insulates the roots from high summer and low winter temperatures while maintaining the trees in an upright position without staking. However, once nursery stock is grown in the ground without confining its root growth, the root growth must be dug out of the ground resulting in a number of the roots being cut, and often, the death or dissatisfactory growth of the nursery stock after transplantation.

A method of growing nursery stock in the ground prior to transplanting such nursery stock wherein the root growth is confined in a porous fabric container is disclosed in U.S. Pat. No. 4,574,522 dated Mar. 11, 1986. In accordance with that method, nursery stock, e.g., a tree, is confined within a porous fabric container and planted in the ground within the container prior to transplantation. The porous fabric container has sufficient strength to constrict roots which penetrate it whereby the root growth outside the container is restricted and enlarged root nodule formation and root branching take place within the container. Upon transplanting the nursery stock, the container and nursery stock are unitarily removed from the ground and the restricted root growth outside the container readily breaks off or comes out of the ground. When transplanted, the container is removed and the root growth, nearly 100% complete, is placed in the ground. Because of the nodule formation and root branching which took place in the container, the root growth rapidly expands whereby the plant is very quickly nourished and anchored in the ground.

The particular fabric used in accordance with the method of U.S. Pat. No. 4,574,522 to form the porous but root constricting, fabric container is a nonwoven, needled fabric formed of synthetic staple fibers. While such fabric and containers formed therefrom have functioned well in carrying out the method of U.S. Pat. No. 4,574,522, there is a need for a fabric having an improved uniformity of thickness and strength. Also, there is a need for a fabric having an improved ability to catch root tips and cause them to initially penetrate the fabric, rather than contacting the inside surface of the fabric and failing to penetrate whereby spiral root growth within the container results.

By the present invention an improved method and fabric container for controlling root growth of nursery stock planted in the ground prior to transplantation meeting the needs described above are provided.

SUMMARY OF THE INVENTION

A method of controlling the root growth of nursery stock planted in the ground prior to transplanting such nursery stock is provided. In accordance with the method, the root growth of the nursery stock is confined while in the ground within a porous fabric container having sufficient strength to constrict penetrating roots so that root growth outside the container is restricted and enlarged root nodule formation and root branching are promoted within the container. The container is formed of a porous, needle punched, synthetic, continuous fiber fabric whereby roots growing within the container are readily caught by the fabric and are caused to initially penetrate the fabric. Once penetration occurs, the fabric constricts the root growth to cause the desired nodule formation and root branching within the container.

The fabric formed of continuous fibers used in accordance with the method and fabric container of the present invention is preferably woven prior to being needle punched. Most preferably, the continuous fibers are woven to form a porous substrate upon which one or more layers of synthetic staple fibers are placed prior to needle punching whereby the staple fibers are attached to the woven substrate and a fuzzy staple fiber root-catching surface is formed on the resulting fabric. The fuzzy surface formed by the staple fibers readily catches growing root tips and causes them to initially penetrate the fabric, but the needle punched, woven, continuous fiber substrate has sufficient strength to constrict the root growth after penetration whereby the root growth is essentially confined within the container.

It is, therefore, a general object of the present invention to provide an improved method and fabric container for controlling the root growth of nursery stock planted in the ground prior to transplantation of such nursery stock.

Another object of the present invention is the provision of a method and fabric container for controlling root growth wherein the fabric forming the container readily catches growing root tips and causes them to initially penetrate the fabric but thereafter sufficiently constricts the growth of the penetrating roots to produce nodule formation and root branching within the container.

A further object of the present invention is the provision of a root control fabric container having an improved uniformity of thickness and strength.

Other and further objects, features and advantages of the present invention will be readily apparent to those skilled in the art upon a reading of description of preferred embodiments which follows when taken in conjunction with the accompanying drawings.

DESCRIPTION OF PREFERRED EMBODIMENTS

Figure 1:
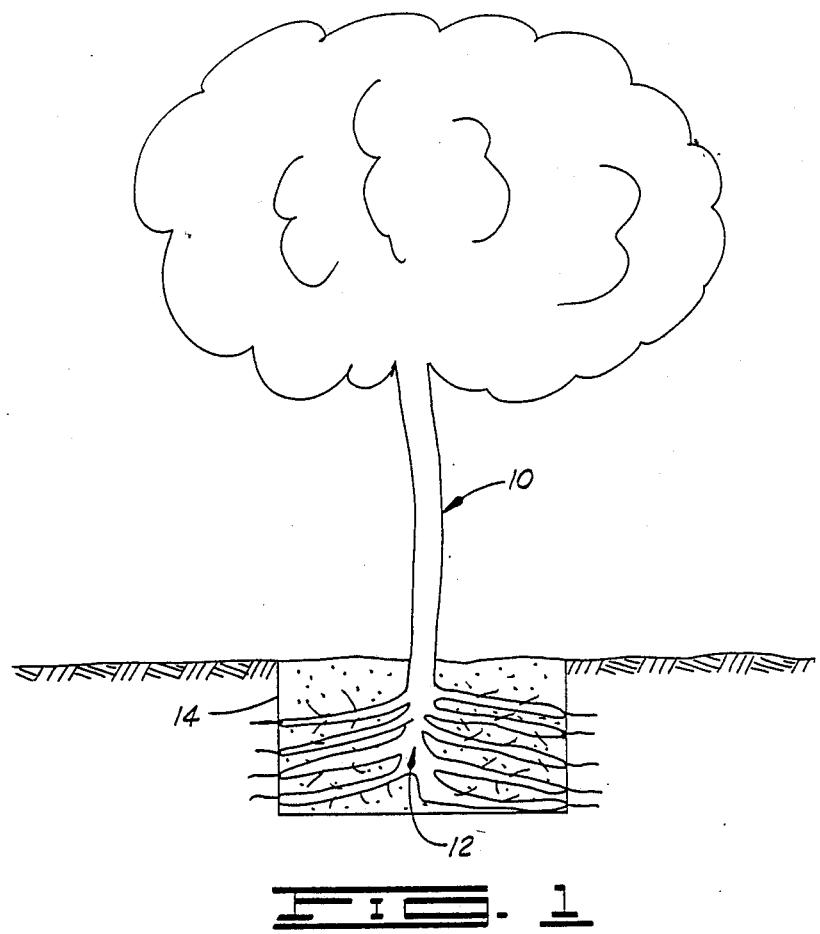
FIG. 1 is a side partially cross-sectional view of a tree planted in the ground within a fabric container of the present invention.

Referring now to the drawings and particularly to FIG. 1, a tree 10 to be transplanted is illustrated planted in the ground with its root growth 12 confined within a synthetic fabric container 14 of the present invention. The root growth 12 is illustrated after the tree 10 has been planted for some period of time whereby root tips have penetrated the fabric container 14, the roots have been constricted thereby and root nodule formation and root branching have occurred within the container, all as described and claimed in U.S. Pat. No. 4,574,522 which is incorporated herein by reference.

Figure 2:
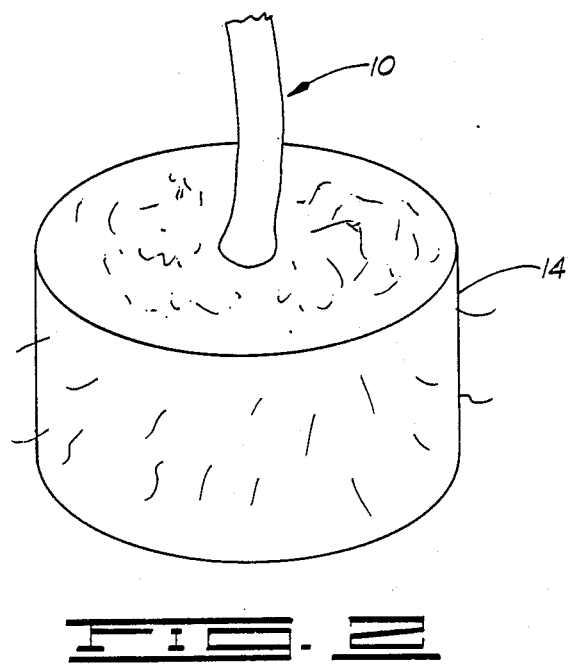
FIG. 2 is a partial side view of the tree, root growth and container of FIG. 1 after being removed from the ground prior to transplantation.

When transplanted, and as shown in FIG. 2, the root growth 12 of the tree 10 and the fabric container 14 are simultaneously removed from the ground whereby the soil and root growth 12 within the container remain intact, but the very restricted root growth outside the container is either broken off or pulled out of the ground. The transplantation process is completed by transporting the tree 10 to its new location, removing the fabric container 14 from the root growth and placing the root growth along with the soil therewith in the ground.

In accordance with the present invention, the method described above is carried out utilizing an improved fabric container formed of a porous, needle punched, continuous fiber fabric. Such fabric has improved uniformity of thickness and strength as well as excellent ability to capture growing root tips and cause the root tips to readily penetrate the fabric. The improved uniformity of thickness and strength allows the fabric to efficiently constrict the growth of penetrating roots whereby nodule formation and root branching within a container formed of the fabric are produced while root growth outside the container is restricted. The ability to capture roots and cause them to penetrate is extremely important, particularly where the root tips of the nursery stock being grown are relatively blunt. For example, the root tips of nut trees such as pecan and hickory trees are rounded and have a greater tendency to be diverted without penetrating by a container fabric than other root tips.

A particularly suitable uniform, porous, needle punched fabric formed of synthetic continuous fibers is manufactured by Polyfelt Incorporated of Evergreen, Ala. under the trade designation "TS". Polyfelt TS600 is a six-ounce continuous fiber, nonwoven, needle punched, polypropylene fabric, and Polyfelt TS650 is a seven-ounce continuous fiber, nonwoven, needle punched polypropylene fabric, both of which are useful in accordance with the present invention.

Other needle punched, continuous fiber fabrics can be utilized in accordance with the present invention, and the continuous fibers can be polyolefin fibers, polyester fibers, polyamide fibers or mixtures thereof. Such continuous fibers can be at least partially fused by heating after being needle punched to provide extra strength thereto. Preferably, the continuous fibers are woven prior to being needle punched with or without heat fusing to provide strength for constricting the growth of penetrating roots. As is well understood by those skilled in the art, the needle punching technique, when applied to either woven or nonwoven continuous fibers, tangles and knots the fibers whereby strength is imparted to the finished fabric.

A particularly preferred fabric for carrying out the method and forming the fabric container of the present invention is formed of continuous fibers selected from the group consisting of polyolefin fibers, polyester fibers, polyamide fibers and mixtures thereof. The continuous fibers are woven to form a substrate, and prior to being needle punched, one or more layers of staple fibers are placed on the substrate. Like the continuous fibers, the staple fibers are preferably selected from the group consisting of polyolefin fibers, polyester fibers, polyamide fibers and mixtures thereof. Most preferably, both the continuous fibers and staple fibers are formed of polypropylene. After the staple fibers are placed on the woven continuous fiber substrate, the staple fibers and substrate are needle punched whereby the staple fibers are attached to one side of the substrate forming a fuzzy surface thereon. The resulting fabric is utilized to form a container of the present invention with the fuzzy surface within the interior of the container.

The fuzzy surface formed by the staple fibers readily catches growing root tips within the container when they reach the walls thereof whereby the root tips initially penetrate the walls of the container. This is contrasted with other fabrics which have a smoother surface whereby upon contacting the walls of the container instead of penetrating the fabric the growing root tip turns and stays within the container. After initial penetration of the fabric, the high strength woven substrate constricts the growth of the roots and limits or restricts root growth outside the container while promoting nodule formation and root branching within the container. A suitable fabric of the type described formed of staple fibers needle punched to a woven continuous fiber substrate is manufactured by the Polymer Group of Exxon Chemical Company. That fabric consists of a three-ounce woven polypropylene continuous fiber substrate having attached thereto three ounces of staple polyester and polypropylene fibers by needle punching. The fabric is produced by first weaving the continuous fiber substrate, air-layering the staple fibers on the substrate and then needle punching the staple fibers into the substrate.

Figures 3, 4:
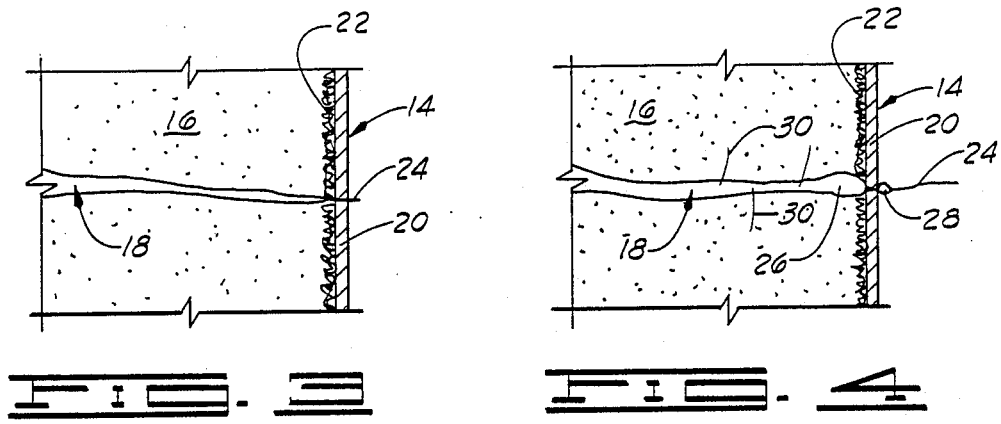
FIG. 3 is a partial cross-sectional view of a fabric container of the present invention containing soil and a root, the tip of the root having been caught and caused to penetrate the fabric container.
FIG. 4 is a partial cross-sectional view similar to FIGURE 3 showing the root after initial growth and constriction by the fabric container.
Figure 5:
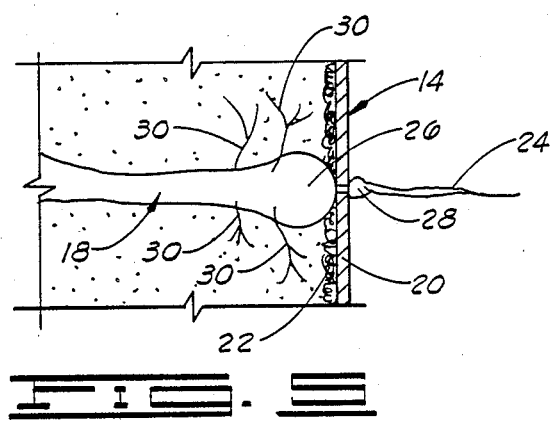
FIG. 5 is a partial cross-sectional view similar to FIGS. 3 and 4 showing the root after considerable additional growth whereby a nodule formation and root branching has occured as a result of the constriction by the fabric container.

Referring now to FIGS. 3–5, a portion of the container 14 containing soil 16 and one of the roots 18 of the tree 10 is shown. The container 10 is formed of the most preferred fabric of this invention, i.e., a woven substrate 20 formed of continuous fibers having staple fibers needle punched thereinto forming a fuzzy staple fiber surface 22 on the inside of the container 14. FIGS. 3, 4 and 5 illustrate a root 18 of the tree 10 when the root initially contacts and penetrates the container 14 (FIG. 3), after initial growth and constriction of the root 18 by the fabric of the container 14 (FIG. 4) and after full growth of the root 18 and constriction thereof by the fabric of the container 14. It is to be noted that while the most preferred fabric is illustrated in FIGS. 3, 4 and 5, the description of the operation of the fabric which follows applies equally to the other continuous fiber fabrics described herein. All of the continuous fiber fabrics have improved root tip catching and initial penetration abilities, are more uniform in thickness and strength and have sufficient strengths to constrict the growth of penetrating roots.

Figure 6:
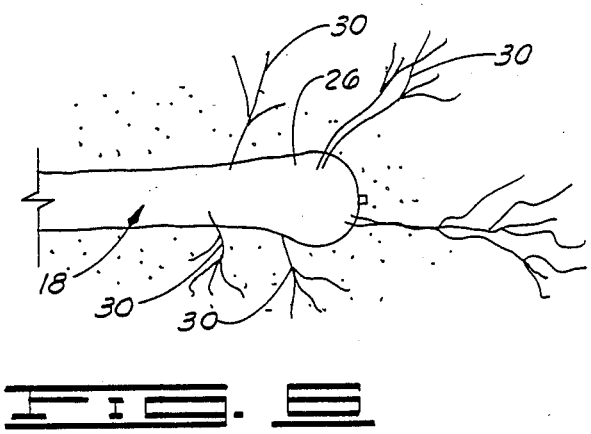
FIG. 6 is a partial side view of the root illustrated in FIGS. 3, 4 and 5 after the fabric container has been removed and the root growth of which the root is a part has been transplanted.

As shown in FIG. 3, when the root tip 24 of the root 18 contacts the fabric wall of the container 14, it is caught by the fuzzy staple fiber surface 22, prevented from turning and sliding along the surface, and caused to penetrate the readily penetratable woven substrate 20. As shown in FIG. 4, after an initial period of growth the root tip 24 which penetrated the fabric 14 grows and extends outside the container 14 only a limited amount as a result of the fabric 14 constricting the growth of the portion of the root extending therethrough. The portion of the root within the container 14, on the other hand, grows and enlarges thereby storing carbohydrates therein. The girdling effect of the fabric forming the container 14 on the root 18 causes an enlarged nodule 26 to form inside the container 14 and a smaller nodule 28 to form outside the container 14. The restriction in the root 18 severely retards growth outside the container 14, and causes a naturally weak structural point in the root 18 which readily breaks when the container 14 is removed from the ground or when the container 14 is removed from the root growth just prior to transplanting. Additionally, the constriction of the root 18 at the fabric wall of the container 14 induces root branching on the inside of the container, i.e., secondary root branches 30 form on the inside of the container 14 along the length of the root 18. As shown in FIG. 5, when the root 18 has fully developed within the confines of the fabric container 14, the root 18 and nodule 26 thereof are enlarged as are the branched roots 30 providing a large quantity of stored carbohydrates in the root and a large number of root tips which are available for reestablishing the plant after transplantation. As shown in FIG. 6, which illustrates the root 18 after the container 14 has been removed and the root 18 has been transplanted, the branched roots 30 quickly extend into the surrounding soil thereby rigidly attaching the tree in the ground, providing water and nutrients to the tree, etc.

Thus, the present invention is well adapted to carry out the objects and attain the ends and advantages mentioned as well as those inherent therein. While numerous changes in the steps and fabric container of the invention can be made by those skilled in the art, such changes are encompassed within the spirit of this invention as defined by the appended claims.

What is claimed is:

1. In a method of controlling the root growth of nursery stock planted in the ground prior to transplanting such nursery stock wherein said root growth is confined within a porous fabric container having sufficient strength to constrict penetrating roots whereby root growth outside the container is restricted and enlarged root nodule formation and root branching are promoted within the container, the improvement which comprises confining said root growth within a container formed of a porous needle punched fabric of woven continuous fibers whereby said roots are readily caught by and caused to initially penetrate said fabric but are sufficiently constricted thereby to produce said nodule formation and root branching.

2. The method of claim 1 wherein said continuous fibers are selected from the group consisting of polyolefin fibers, polyester fibers, polyamide fibers and mixtures thereof.

3. The method of claim 1 wherein said continuous fibers are polypropylene fibers.

4. In a method of controlling the root growth of nursery stock planted in the ground prior to transplanting such nursery stock wherein said root growth is confined within a porous synthetic fabric container having sufficient strength to constrict penetrating roots whereby root growth outside the container is restricted and enlarged root nodule formation and root branching are promoted within the container, the improvement which comprises confining said root growth within a container formed of a pourous needle punched fabric of woven continuous fibers having staple fibers attached within the interior thereof by needle punching whereby said fabric has a fuzzy interior surface which causes roots to be caught and readily initially penetrate said fabric prior to being sufficiently constricted by said fabric to produce said nodule formation and root branching.

5. The method of claim 4 wherein said continuous fibers are selected from the group consisting of polyolefin fibers, polyester fibers, polyamide fibers and mixtures thereof.

6. The method of claim 5 wherein said staple fibers are selected from the group consisting of polyolefin fibers, polyester fibers, polyamide fibers and mixtures thereof.

7. The method of claim 4 wherein both of said continuous fibers and staple fibers are polypropylene fibers. a
* * * * *